US010015565B2

(12) United States Patent
Narasipuram (10) Patent No.: US 10,015,565 B2
(45) Date of Patent: Jul. 3, 2018

(54) METHOD AND SYSTEM FOR ENABLING INTERACTIVE INFOMERCIALS

(71) Applicant: Sravan Kumar Narasipuram, Hyderabad (IN)

(72) Inventor: Sravan Kumar Narasipuram, Hyderabad (IN)

(73) Assignee: ABDA Digital Private Limited, Gachibowli, Hyderabad (IN)

( * ) Notice: Subject to any disclaimer, the term of this patent is extended or adjusted under 35 U.S.C. 154(b) by 0 days.

(21) Appl. No.: 15/220,745

(22) Filed: Jul. 27, 2016

(65) Prior Publication Data

US 2017/0041687 A1   Feb. 9, 2017

(30) Foreign Application Priority Data

Jul. 27, 2015   (IN) .......................... 3830/CHE/2015

(51) Int. Cl.
| | | |
|---|---|---|
| *H04N 7/10* | (2006.01) | |
| *H04N 7/025* | (2006.01) | |
| *H04N 21/8545* | (2011.01) | |
| *G06F 3/00* | (2006.01) | |
| *G06Q 30/02* | (2012.01) | |

(Continued)

(52) U.S. Cl.
CPC .......... *H04N 21/8545* (2013.01); *G06F 3/00* (2013.01); *G06Q 30/0241* (2013.01); *G06Q 30/0277* (2013.01); *H04L 61/2007* (2013.01); *H04L 67/146* (2013.01); *H04L 67/18* (2013.01); *H04L 67/306* (2013.01); *H04N 21/2668* (2013.01); *H04N 21/435* (2013.01);

(Continued)

(58) Field of Classification Search
CPC ... H04L 51/36; H04L 63/102; H04L 12/1818; H04L 51/12; H04L 51/14; H04L 67/02; H04L 51/18; H04L 51/00; H04L 51/32; H04L 51/34; H04L 51/38; H04L 63/101; H04L 63/083; H04L 67/2823; H04L 67/2828

See application file for complete search history.

(56) References Cited

U.S. PATENT DOCUMENTS

| | | | | |
|---|---|---|---|---|
| 8,712,450 | B2 * | 4/2014 | Dennard ........... | H04M 3/42382 370/352 |
| 2012/0166561 | A1 * | 6/2012 | Kelly ........................ | G06F 9/00 709/206 |
| 2016/0205442 | A1 * | 7/2016 | Yee ........................ | G06Q 30/02 725/34 |

* cited by examiner

*Primary Examiner* — Fred Peng
(74) *Attorney, Agent, or Firm* — Wolf, Greenfield & Sacks, P.C.

(57) ABSTRACT

Embodiments of present disclosure relates to a method and an interactive infomercial system for enabling interactive infomercials. In one embodiment, data associated with user of viewing interactive infomercial content may be received on a mobile viewing device. The system may select one interactive infomercial content based on the received data. Upon selection, at least one infomercial unit comprising the at least one interactive infomercial content such as animation content, a unique infomercial identification information (U3I) associated with the selected interactive infomercial content is generated and transmitted to the mobile viewing device of the user. The mobile viewing device receives and downloads the animation content and enables connecting back with the system for further interactions. Thus, the system and method enables real-time interactive infomercials to the users without consuming memory of the mobile viewing device as well as without modifying the U3I associated with the infomercial content.

18 Claims, 4 Drawing Sheets

(51) Int. Cl.
  *H04L 29/12* (2006.01)
  *H04L 29/08* (2006.01)
  *H04N 21/2668* (2011.01)
  *H04N 21/435* (2011.01)
  *H04N 21/45* (2011.01)
  *H04N 21/81* (2011.01)
  *H04N 21/858* (2011.01)
  *G06F 3/0482* (2013.01)

(52) U.S. Cl.
  CPC ....... *H04N 21/4532* (2013.01); *H04N 21/812* (2013.01); *H04N 21/8586* (2013.01); *G06F 3/0482* (2013.01)

METHOD AND SYSTEM FOR ENABLING INTERACTIVE INFOMERCIALS

CROSS REFERENCE TO RELATED APPLICATIONS

This application claims the benefit of and priority to Indian Application No. 3830/CHE/2015, filed Jul. 27, 2015, the entire contents of which are incorporated herein by reference.

FIELD OF THE DISCLOSURE

The present subject matter is related, in general to interactive infomercials, and more particularly, but not exclusively to a method and a system for enabling interactive infomercials on mobile devices of users with ability to connect back with the infomercial providers.

BACKGROUND

Infomercials are typically distributed to mobile viewing devices i.e. wireless mobile devices using multicasting based on user preferences. As a result, the same infomercial content may be received by multiple mobile users. Infomercials include advertisements, tutorials, online technical manuals, and so on. Typically, infomercials are transmitted to users over mobile messaging services such as short message service (SMS), instant messaging (IM) service or the like. The infomercials may be built to run on a mobile data service to provide real-time information or lead requests to the users and also enables screening of responders to the lead request. However, the infomercials that have been provided to the users consume huge memory and requires large data bandwidth for execution. Although, infomercials like online chat engagement services provide a platform that yield reportedly profitable improvements for the business owners, still there requires a need for further improvement to achieve higher customer service satisfaction levels and conversion rates. Therefore, there is a need for an improved method and a system that enables interactive infomercials on mobile devices of users with ability to connect back with the infomercial providers.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Accordingly, the present disclosure relates to a method of enabling interactive infomercials. The method comprises step of receiving data associated with user of viewing one or more interactive infomercial content on a mobile viewing device associated with a user and selecting at least one interactive infomercial content corresponding to the received user data. Upon selection, the method comprises the step of generating at least one infomercial unit comprising the at least one interactive infomercial content, and a unique infomercial identification information (U3I) associated with the selected interactive infomercial content. The infomercial unit also comprises a predetermined transmit mode for transmitting the interactive infomercial content and a plurality of connect back response modes for responding to the interactive infomercial content; and the interactive infomercial content includes at least an interactive animation content. In response to generating the infomercial unit, the method comprises the step of transmitting the at least one infomercial unit in the predetermined transmit mode to the mobile viewing device of the user.

Further, the present disclosure relates to a system for enabling interactive infomercials. The system comprises at least a processor and one or more mobile viewing device associated with user, coupled with the processor. The system further comprises a memory communicatively coupled with the processor, wherein the memory stores processor-executable instructions, which, on execution, cause the processor to receive data associated with user of viewing one or more interactive infomercial content on the one or more mobile viewing device associated with a user. The processor is configured to select at least one interactive infomercial content corresponding to the received user data and generate at least one infomercial unit comprising the at least one interactive infomercial content, and a unique infomercial identification information (U3I) associated with the selected interactive infomercial content. The at least one infomercial unit also comprises a predetermined transmit mode for transmitting the interactive infomercial content and a plurality of connect back response modes for responding to the interactive infomercial content, wherein the interactive infomercial content includes at least an interactive animation content. Upon generation of the at least one infomercial unit, the processor is configured to transmit the at least one infomercial unit in the predetermined transmit mode to the mobile viewing device of the user.

Furthermore, the present disclosure relates to a non-transitory computer readable medium including instructions stored thereon that when processed by at least one processor cause a system to receive data associated with user of viewing one or more interactive infomercial content on a mobile viewing device associated with a user and select at least one interactive infomercial content corresponding to the received user data. Further, the instructions cause the processor to generate at least one infomercial unit comprising the at least one interactive infomercial content, a unique infomercial identification information (U3I) associated with the selected interactive infomercial content, a predetermined transmit mode for transmitting the interactive infomercial content and a plurality of connect back response modes for responding to the interactive infomercial content, wherein the interactive infomercial content includes at least an interactive animation content. Upon generating the at least one infomercial unit, the at least one processor enables transmitting the at least one infomercial unit in the predetermined transmit mode to the mobile viewing device of the user.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed embodiments. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

The present disclosure relates to a method and an interactive infomercial system for enabling interactive infomercials. In one embodiment, data associated with user of viewing interactive infomercial content may be received on a mobile viewing device. The system may select one interactive infomercial content based on the received data. Upon selection, at least one infomercial unit comprising the at least one interactive infomercial content such as animation content, a unique infomercial identification information (U3I) associated with the selected interactive infomercial content is generated and transmitted to the mobile viewing device of the user. The mobile viewing device of the user receives and downloads the animation content and enables connecting back with the system for further interactions. Thus, the system and method enables real-time interactive infomercials to the users such as animation content without consuming memory of the mobile viewing device as well as without modifying the U3I associated with the infomercial content.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
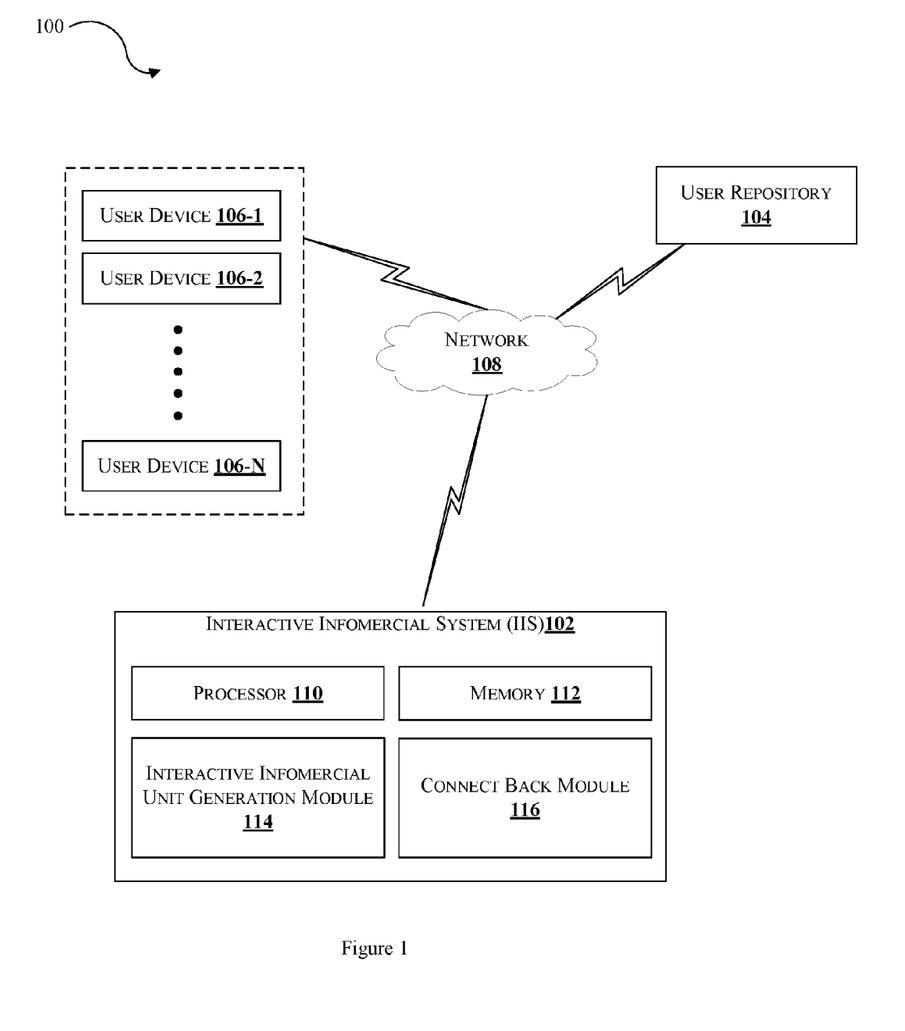
FIG. 1 illustrates an architecture diagram of an exemplary system for enabling interactive infomercials in accordance with some embodiments of the present disclosure.

FIG. 1 illustrates an architecture diagram of an exemplary system for enabling interactive infomercials in accordance with some embodiments of the present disclosure.

As shown in FIG. 1, the exemplary system 100 comprises one or more components configured for enabling interactive infomercials. The system 100 can be implemented as a networked client-server communication system. In one embodiment, the exemplary system 100 comprises an interactive infomercial system (hereinafter referred to as IIS) 102, a user repository 104 and one or more mobile viewing user devices 106-1, 106-2, . . . 106-N (collectively referred to as user devices 106) connected via a communication network 108. Each of these devices may communicate with each other via one or more communication channels or communication network 108. The communication network 108 may be such as the Internet, cable, satellite, local area network (LAN), wide area networks (WAN), telephone networks or the like. Any of the devices described herein may be directly connected to each other and/or connected over one or more networks 108.

The IIS 102 may provide one or more functions or services to a number of user devices 106. In one embodiment, the IIS 102 may be a computing device having a large storing capacity, with one or more microprocessors and high-speed network connections. In one example, the IIS 102 may be a web application and the components of the IIS 102 may support the construction of web pages via web browser. The user repository 104 and the IIS 102 are illustrated as separate devices, however in one embodiment, the user repository 104 may be combined or integrated within the IIS 102. The user repository 104 stores information in one or more databases requested from the IIS 102 through a front-end running on the user device 106. The user device 106, may be for example, a mobile phone or smart device configured to run a client program i.e. web browser, etc. that can access the one or more functions or services provided by the IIS 102. Further, the user device 106 may access information or other content stored at the IIS 102 or at the user repository 104.

Figure 2:
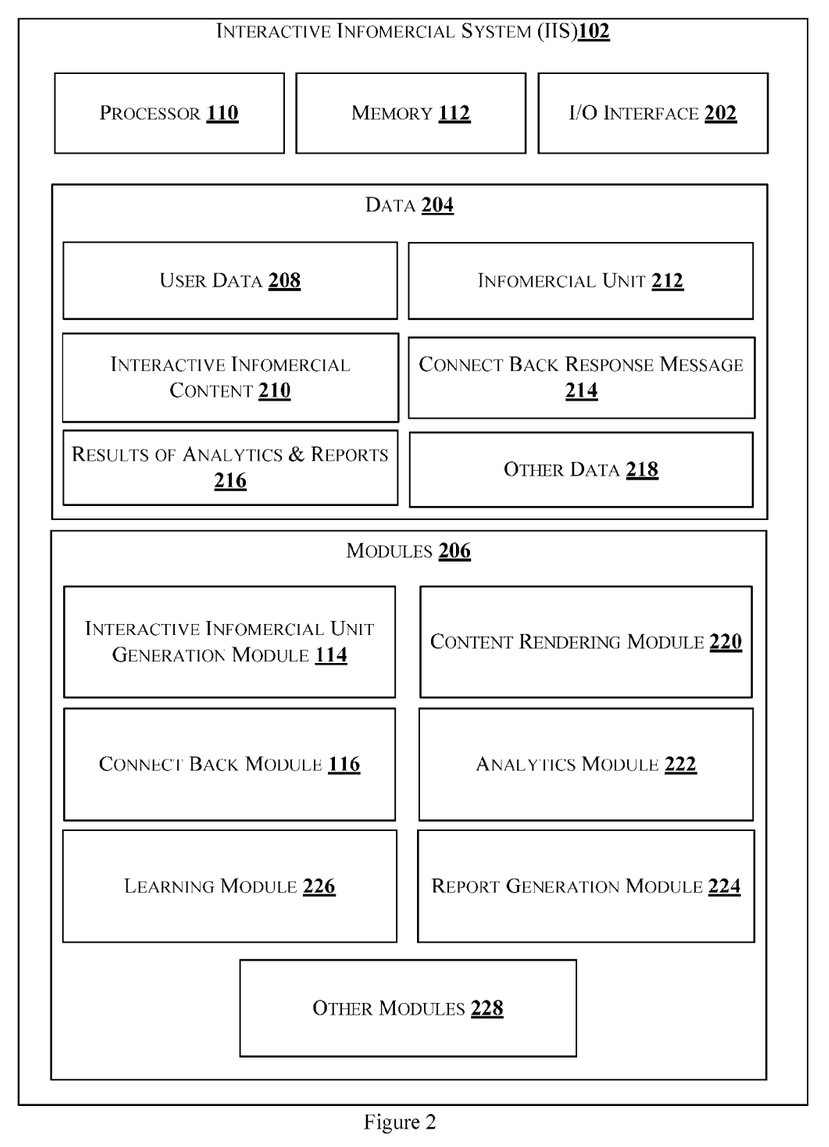
FIG. 2 illustrates an exemplary block diagram of an interactive infomercial system (IIS) of FIG. 1 in accordance with some embodiments of the present disclosure.

In one embodiment, the IIS 102 comprises at least a processor 110 and a memory 112 coupled with the processor 110. The IIS 102 further comprises an interactive infomercial unit generation module (hereinafter referred to as "IIU generation module") 114 and a connect back module 116 coupled with the processor 110. The IIS 102 may be a typical IIS as illustrated in FIG. 2. The IIS 102 comprises the processor 110, the memory 112, and an I/O interface 202. The I/O interface 202 is coupled with the processor 110 and an I/O device. The I/O device is configured to receive inputs via the I/O interface 202 and transmit outputs for displaying in the I/O device via the I/O interface 202.

The IIS 102 further comprises data 204 and modules 206. In one implementation, the data 204 and the modules 206 may be stored within the memory 112. In one example, the data 204 may include user data 208, interactive infomercial content 210, infomercial unit 212, connect back response message 214, results of analytics and reports 216 and other data 218. In one embodiment, the data 204 may be stored in the memory 112 in the form of various data structures. Additionally, the aforementioned data can be organized using data models, such as relational or hierarchical data models. The other data 218 may be also referred to as reference repository for storing recommended implementation approaches as reference data. The other data 218 may also store data, including temporary data and temporary files, generated by the modules 206 for performing the various functions of the IIS 102.

The modules 206 may include, for example, the IIU generation module 114, the connect back module 116, a content rendering module 220, an analytics module 222, a report generation module 224 and a learning module 226. The modules 206 may also comprise other modules 228 to perform various miscellaneous functionalities of the IIS 102. It will be appreciated that such aforementioned modules may be represented as a single module or a combination of different modules. The modules 206 may be implemented in the form of software, hardware and/or firmware.

In operation, the IIS 102 enables rendering of interactive infomercials on the user device 106. In one embodiment, the IIS 102 may be a dedicated system interacting with user devices 106 and the user repository 104. The user repository 104 is configured to store the user data 208 that includes among others, user profile information such as personal details, user preferences and/or interests of viewing the one or more interactive infomercial content 210 on the user devices 106 and connect back response messages. The user data 208 may be obtained from one or more sources such as Enterprise Resource Planning (ERP)/Customer relationship management (CRM) modules coupled with the IIS 102, or social media platforms like Facebook®, Twitter®, Pinterest, YouTube® and so on. The interactive infomercial content 210 may be an animation content that comprises one or more animation sections that are independently downloadable and played in a series or in any predefined manner without any time delay. The animation content is downloaded and played on a user defined interface on the user devices 106.

The animation content may be animated infomercials for special occasions like birthdays, wedding anniversaries and other occasions associated to the users. In another example, the animation content may be animated advertisements of a particular product owned by a brand entity. In yet another example, the animation content may be animated manual instructions capable of providing information of a particular action or task such as fixing any product or handling maintenance and repair of a product or trouble shooting processes. The animation content is selected by the IIU generation module 114 based on the user data 208 that indicates the user requirements.

In one implementation, the IIU generation module 114 determines one or more animation content matching with the user preferences of the user data 208 and selects the animation content based on determination. The selected animation content may also be processed or edited to customize or personalized based on user preferences and/or interests for better acceptance by the users. Upon selection, the IIU generation module 114 generates the at least one infomercial unit 212 for the selected animation content and transmit to the user devices 106. In one aspect, IIU generation module 114 generates the at least one infomercial unit 212 that includes the selected interactive infomercial content 210 i.e. the animation content and a unique infomercial identification information (U3I) associated with the selected interactive infomercial content 210. In one implementation, the U3I may comprise at least one or more of unique Uniform Resource Locator (URL) and friendly URL associated with the interactive infomercial content 210. The unique URL may be a randomly generated alphanumeric characters of predetermined size and the friendly URL may be a personalized alphanumeric characters of predetermined size associated with the interactive infomercial content source and the user data 208.

To this end, the IIU generation module 114 may employ a random number generator to generates a unique URL that comprises random alphanumeric characters between a predetermined range to assign as the U3I. In another example, the IIU generation module 114 may generate a friendly URL that comprises infomercial provider's domain name in combination with the user's personalized information for better identification. In yet another example, the friendly URL may also enable a customized wait cursor to be displayed when the friendly URL is enabled. In another embodiment, the IIU generation module 114 may also determine if there is an active unique URL or friendly URL associated with a different infomercial content 210 within a predefined threshold around the alphanumeric characters selected to minimize possible collisions between nearby URL. The IIU generation module 114 generates a redirect URL associated with the interactive infomercial content 210 and maps the plurality of unique or friendly URLs that are generated with the redirect URL. On mapping with the redirect URL, the IIU generation module 114 enables creation of U3I comprising the plurality of unique or friendly URLs and store the U3I in the infomercial unit 212.

The infomercial unit 212 further comprises information associated with a predetermined transmit mode for transmitting the interactive infomercial content 210 to the user devices 106. In one example, the transmit mode may include one or more modes of communication channels for transmitting the U3I to the user devices 106. The transmit mode may be, SMS message, Facebook/Twitter post, email, and so on. Furthermore, the infomercial unit 212 comprises a plurality of connect back response modes selected by the user devices 106 for responding to the interactive infomercial content 210. In one example, the plurality of connect back response modes may be phone call, SMS, email, Facebook, Twitter, and so on. Upon generation of the infomercial unit 212, the IIS 102 transmits the infomercial unit 212 in the one or more predetermined transmit modes to the user devices 106. In one example, the infomercial unit 212 may be transmitted to the user devices 106 via push notifications after customization and personalization.

The user devices 106 receives the infomercial unit 212 from the IIS 102 and downloads the interactive infomercial content 210 i.e. the animation content on the user devices 106. In one embodiment, the content rendering module 220 is configured to enable downloading and rendering of the interactive infomercial content 210 on the user devices 106. In one embodiment, the content rendering module 220 derives the U3I from the received infomercial unit 212 and determines the plurality of unique or friendly URLs embedded with the derived infomercial unit 212. Further, the content rendering module 220 decodes a corresponding redirect URL mapped with the plurality of unique or friendly URLs and downloads the interactive infomercial content 210 from the redirect URL thus derived. Upon downloading, the content rendering module 220 enables rendering of the interactive infomercial content 210 on the user devices 106.

In one embodiment, the user devices 106 comprises a pre-defined user interface for rendering the interactive infomercial content 210. In one example, the pre-defined user interface may be a typical web browser that downloads and plays the animation content. The pre-defined user interface also comprises a plurality of user defined connect back buttons, represented as icons, placed at one or more user-defined locations on the user interface. In one embodiment, the user is provided with an option to place the plurality of user defined connect back buttons by dragging these buttons icons on an interactive touch screen of the user devices 106. The plurality of user defined connect back buttons indicate the one or more connect back response modes and enable triggering of one of the connect back response modes by invoking corresponding protocol when the corresponding connect back button/icons are activated by touch or double click. In one example, the connect back response modes may be click-to-action modes including actions like click-to-call, click-to-browse, click-to-message, click-to-mail, click-to-share, click-to-download and so on. Therefore, each time an infomercial animation content 210 is rendered and displayed on the user devices 106, the plurality of connect back response modes are activated such that the user can connect back with the IIS 102 using the one or more connect back response modes selected by the user.

The connect back module 116 receives the user selection of the plurality of connect back response modes as well as user inputs such as email, or message or any information as connect back response from the user. In one embodiment, the connect back module 116 generates a connect back response message 214 comprising the transmit mode of receiving the infomercial unit 212, the U3I associated with the interactive infomercial content 210 and the user inputs related to the interactive infomercial content 210. The connect back module 116 encrypts the connect back response message 214 and stores the encrypted connect back response message 214 in the user repository 104 or in the memory 112 of the IIS 102. Further, the connect back module 116 invokes appropriate connect back actions on the pre-defined user interface of the user devices 106 for further processing. The IIS 102 also monitors the connect back actions and analyses the connect back actions to derive one or more analytical information such as virality of the interactive infomercials and connect back response scores based on the user interests.

The analytics module 222 determines the virality of the interactive infomercials based on frequency and count of the plurality of connect back response messages 214 generated in response to the number of times the infomercials are being shared on user devices 106. In one example, if a user A receives the infomercial unit 210 and forwards the infomercial unit 210 to another user B, the analytics module 222 determines the virality of the particular interactive infomercial based on the locations or network (Internet Protocol IP) addresses from where the infomercial content 210 is accessed and the time period between the accesses, connect back response time duration and predetermined transmit modes. The analytics module 222 is also capable of uniquely identifying and recording the chain of user devices 106 that accessed or downloaded the interactive infomercial content 210 and capable of determining analytics information including a plurality of response scores associated with the connect back responses to the interactive infomercial content 210. The report generation module 224 generates one or more reports that are generated based on the analytics information determined by the analytics module 222. In one embodiment, the report generation module 224 generates the one or more reports comprising the plurality of response scores associated with the connect back responses based on geographical location of the user, network (IP) address of the user devices 106, connect back response time, and predetermined transmit modes. In one example, the report generation module 224 may generate reports comprising plurality of response scores associated with the connect back responses based on the transmit mode such as email, message, and social media platforms like Facebook® etc. through which the infomercial unit 212 were transmitted to the user devices 106.

The learning module 226 is configured to monitor the connect back response messages of the user devices 106 to determine the user behavior or past history and enable automatic highlighting of one or more connect back response modes that the user may prefer based on the past history. In one example, if the learning module 226 determines that a user A is more frequently using phone as connect back response mode to interact with the infomercial content 210, then the learning module 226 automatically highlights the phone call connect back response button/icon as compared to other connect back response button/icons. In another embodiment, the learning module 226 may also determine to display or hide few of the connect back response button/icon based on user behavior in the past.

Thus, the above disclosed system and method enables real-time interactive infomercials to the users such as animation content without consuming memory of the mobile viewing device as well as without modifying the U3I associated with the infomercial content.

Figure 3:
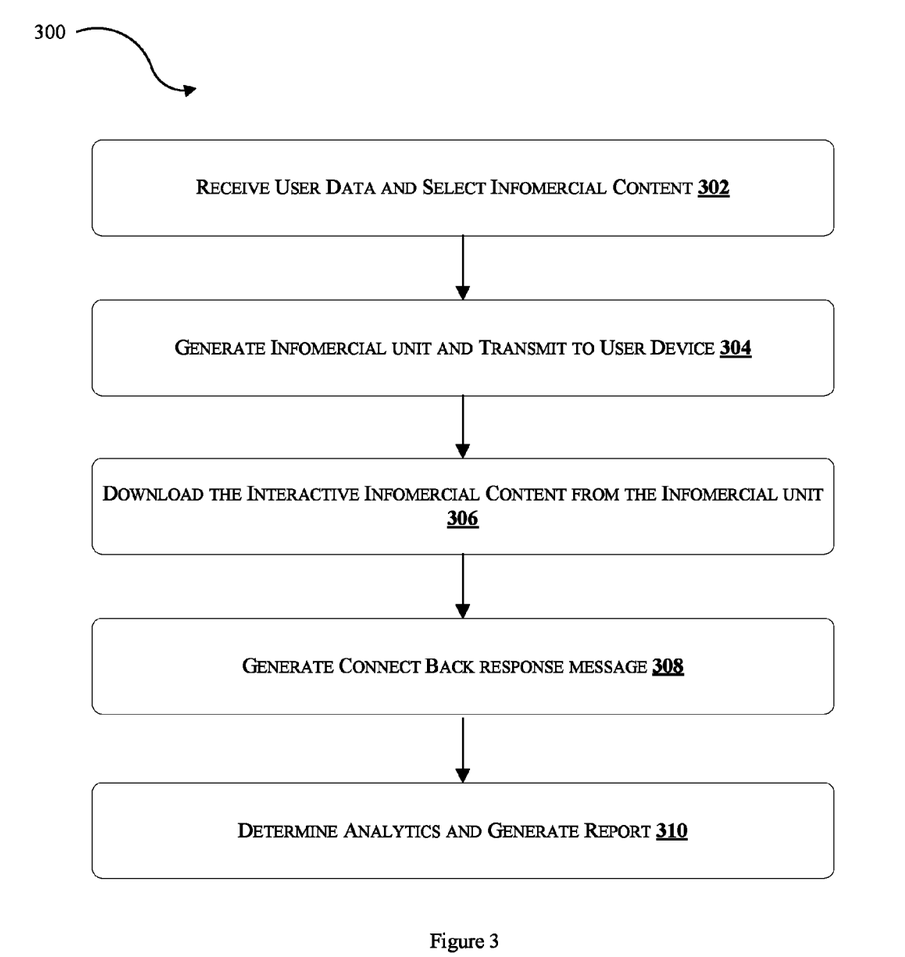
FIG. 3 illustrates a flowchart of an exemplary method of enabling interactive infomercials in accordance with some embodiments of the present disclosure.

FIG. 3 illustrates a flowchart of a method of enabling interactive infomercials in accordance with some embodiments of the present disclosure.

As illustrated in FIG. 3, the method 300 comprises one or more blocks implemented by the processor 110 for enabling interactive infomercials on user devices 106. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method 300. Additionally, individual blocks may be deleted from the method 300 without departing from the spirit and scope of the subject matter described herein. Furthermore, the method 300 can be implemented in any suitable hardware, software, firmware, or combination thereof.

At block 302, receive user data and select infomercial content. In one embodiment, the IIS 102 may be a dedicated system interacting with user devices 106 and the user repository 104. The user repository 104 is configured to store the user data 208 that includes among others, user profile information such as personal details, user preferences and/or interests of viewing the one or more interactive infomercial content 210 on the user devices 106 and connect back response messages. The user data 208 may be received from one or more sources such as Enterprise Resource Planning (ERP)/Customer relationship management (CRM) modules coupled with the IIS 102, or social media platforms like Facebook®, Twitter®, Pinterest, YouTube® and so on. Upon receiving the user data 208, the animation content is selected by the IIU generation module 114 based on the user data 208. In one implementation, the IIU generation module 114 determines one or more animation content matching with the user preferences of the user data 208 and selects the animation content based on determination. The selected animation content may also be processed or edited to customize or personalized based on user preferences and/or interests for better acceptance by the users.

At block 304, generate infomercial unit and transmit to user device. In one embodiment, the IIU generation module 114 generates the at least one infomercial unit 212 for the selected animation content and transmit to the user devices 106. In one aspect, IIU generation module 114 generates the at least one infomercial unit 212 that includes the selected interactive infomercial content 210 i.e. the animation content 210 and a unique infomercial identification information (U3I) associated with the selected interactive infomercial content 210. In one implementation, the U3I may comprise at least one or more of unique Uniform Resource Locator (URL) and friendly URL associated with the interactive infomercial content 210. The unique URL may be a randomly generated alphanumeric characters of predetermined size and the friendly URL may be a personalized alphanumeric characters of predetermined size associated with the interactive infomercial content source and the user data 208.

The IIU generation module 114 generates a redirect URL associated with the interactive infomercial content 210 and maps the plurality of unique or friendly URLs that are generated with the redirect URL. On mapping with the redirect URL, the IIU generation module 114 enables creation of U3I comprising the plurality of unique or friendly URLs and store the U3I in the infomercial unit 212.

The infomercial unit 212 further comprises information associated with a predetermined transmit mode for transmitting the interactive infomercial content 210 to the user devices 106 and also comprises a plurality of connect back response modes by the user devices 106 for responding to the interactive infomercial content 210 by the users. In one example, the transmit mode may include one or more modes of communication channels for transmitting the U3I to the user devices 106. The transmit mode may be, SMS message, Facebook/Twitter post, email, and so on. In another example, the plurality of connect back response modes may be phone call, SMS, email, Facebook, Twitter, and so on. Upon generation of the infomercial unit 212, the IIS 102 transmits the infomercial unit 212 in one or more transmit modes to the user devices 106. In one implementation, the infomercial unit 212 may be transmitted to the user devices 106 via push notifications after customization and personalization.

At block 306, download the interactive infomercial content from the infomercial unit. In one embodiment, the user devices 106 receives the infomercial unit 212 from the IIS 102 and downloads the interactive infomercial content i.e. the animation content 210 on the user devices 106. In one embodiment, the content rendering module 220 is configured to enable downloading and rendering of the interactive infomercial content 210 on the user devices 106. In one embodiment, the content rendering module 220 derives the U3I from the received infomercial unit 212 and determines the plurality of unique or friendly URLs embedded with the derived infomercial unit 212. Further, the content rendering module 220 decodes a corresponding redirect URL mapped with the plurality of unique or friendly URLs and downloads the interactive infomercial content 210 from the redirect URL thus derived. Upon downloading, the content rendering module 220 enables rendering of the interactive infomercial content 210 on the user devices 106. In one embodiment, the user devices 106 comprises a pre-defined user interface for rendering the animation content. Each time an infomercial animation content 210 is rendered and displayed on the user devices 106, the plurality of connect back response modes are activated such that the user can connect back with the IIS 102 using the one or more connect back response modes selected by the user.

At block 308, generate connect back response message. In one embodiment, the connect back module 116 receives the user selection of the plurality of connect back response modes as well as user inputs such as email, or message or any information as connect back response from the user. In one embodiment, the connect back module 116 generates a connect back response message 214 comprising the transmit mode of receiving the infomercial unit 212, the U3I associated with the interactive infomercial content 210 and the user inputs related to the interactive infomercial content 210. The connect back module 116 encrypts the connect back response message 214 and stores the encrypted connect back response message 214 in the user repository 104 or in the memory 112 of the IIS 102. Further, the connect back module 116 invokes appropriate connect back actions on the pre-defined user interface of the user devices 106 for further processing.

At block 310, determine analytics and generate report. In one embodiment, the IIS 102 also monitors the connect back actions and analyses the connect back actions to derive one or more analytical information such as virality of the interactive infomercials and connect back response scores based on the user interests. The analytics module 222 determines the virality of the interactive infomercials based on frequency and count of the plurality of connect back response messages 214 generated in response to the number of times the infomercials are being shared on user devices 106. In one example, if a user A receives the infomercial unit 210 and forwards the infomercial unit 210 to another user B, the analytics module 222 determines the virality of the particular interactive infomercial based on the locations or network (Internet Protocol IP) addresses from where the infomercial content 210 is accessed and the time period between the accesses, connect back response time duration and predetermined transmit modes. The analytics module 222 is also capable of uniquely identifying and recording the chain of user devices 106 that accessed or downloaded the interactive infomercial content 210 and determine analytics information including a plurality of response scores associated with the connect back responses to the interactive infomercial content 210. The report generation module 224 also generates one or more reports that are generated based on the analytics information determined by the analytics module 222. In one embodiment, the report generation module 224 generates the one or more reports comprising the plurality of response scores associated with the connect back responses based on geographical location of the user, network (IP) address of the user devices 106, connect back response time, and predetermined transmit modes. In one example, the report generation module 224 may generate reports comprising plurality of response scores associated with the connect back responses based on the transmit mode such as email, message, and social media platforms like Facebook® etc. through which the infomercial unit 212 were transmitted to the user devices 106.

The learning module 226 is configured to monitor the connect back response messages of the user devices 106 to determine the user behavior or past history and enable automatic highlight of one or more connect back response modes that the user may prefer based on the past history. In one example, if the learning module 226 determines that a user A is more frequently using phone as connect back response mode to interact with the infomercial content 210, then the learning module 226 automatically highlights the phone call connect back response button/icon as compared to other connect back response button/icons. In another embodiment, the learning module 226 may also determine to display or hide few of the connect back response button/icon based on user behavior in the past.

Thus, the above disclosed system and method enables real-time interactive infomercials to the users such as animation content without consuming memory of the mobile viewing device as well as without modifying the U3I associated with the infomercial content.

Figure 4:
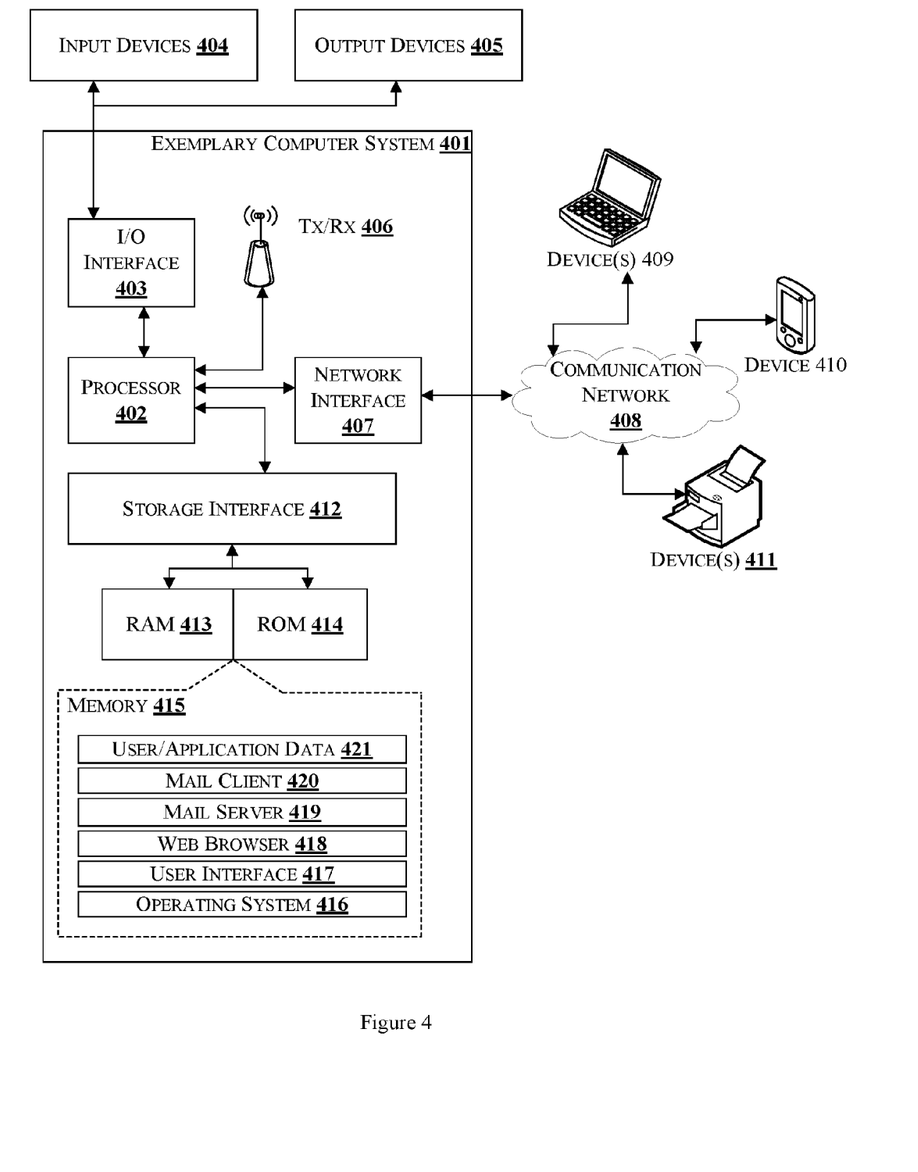
FIG. 4 is a block diagram of an exemplary computer system for implementing embodiments consistent with the present disclosure.

FIG. 4 is a block diagram of an exemplary computer system for implementing embodiments consistent with the present disclosure.

Variations of computer system 401 may be used for implementing all the computing systems that may be utilized to implement the features of the present disclosure. Computer system 401 may comprise a central processing unit ("CPU" or "processor") 402. Processor 402 may comprise at least one data processor for executing program components for executing user- or system-generated requests. The processor may include specialized processing units such as integrated system (bus) controllers, memory management control units, floating point units, graphics processing units, digital signal processing units, etc. The processor 402 may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface 407 may employ connection protocols including, without limitation, direct connect, Ethernet (e.g., twisted pair 10/40/400 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409, 410, and 411. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 4Error! Reference source not found.14, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 415 may store a collection of program or database components, including, without limitation, an operating system 4Error! Reference source not found.16, user interface application 5Error! Reference source not found.17, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As described above, the modules 206 amongst other things, include routines, programs, objects, components, and data structures, which perform particular tasks or implement particular abstract data types. The modules 206 may also be implemented as, signal processor(s), state machine(s), logic circuitries, and/or any other device or component that manipulate signals based on operational instructions. Further, the modules 206 can be implemented by one or more hardware components, by computer-readable instructions executed by a processing unit, or by a combination thereof.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, nonvolatile memory, hard drives, CD ROMs, DVDs, flash drives, disks, and any other known physical storage media.

It is intended that the disclosur e and examples be considered as exemplary only, with a true scope and spirit of disclosed embodiments being indicated by the following claims.

What is claimed is:

1. A method for enabling interactive infomercials, comprising: receiving, by an interactive infomercial system (IIS), data associated with user of viewing one or more interactive infomercial content on a mobile viewing device associated with a user; selecting at least one interactive infomercial content corresponding to the received user data; generating at least one infomercial unit comprising the at least one interactive infomercial content, a unique infomercial identification information (U3I) associated with the selected interactive infomercial content, a predetermined transmit mode for transmitting the interactive infomercial content and a plurality of connect back response modes for responding to the interactive infomercial content, wherein the interactive infomercial content includes at least an interactive animation content, wherein the U3I comprises at least one or more of unique Uniform Resource Locator (URL) and friendly URL associated with the interactive infomercial content, wherein the unique URL is a randomly generated alphanumeric characters of predetermined size and the friendly URL is a personalized alphanumeric characters of predetermined size associated with the interactive infomercial content source and the user data; and transmitting the at least one infomercial unit in the predetermined transmit mode to the mobile viewing device of the user; wherein the U3I is determined by one or more steps of: generating a plurality of unique or friendly URLs associated with the interactive infomercial content; generating a redirect URL associated with the interactive infomercial content; mapping the plurality of unique or friendly URLs to the redirect URL; and embedding the plurality of unique or friendly URLs in the at least one infomercial unit.

2. The method as claimed in claim 1, further comprising:
    downloading and rendering the at least one interactive infomercial content of the infomercial unit along with user data in the one or more mobile viewing device of the user, wherein the user data comprises user profile information and user transaction data;

receiving, from the mobile viewing device, user selection of at least one connect back response mode in response to the rendered interactive infomercial content;

generating a connect back response message comprising the transmit mode, the connect back response mode selected by the user, the U3I associated with the interactive infomercial content and the user inputs related to the infomercial content; and storing the connect back response message in the IIS.

3. The method as claimed in claim 2, wherein the step of downloading the at least one interactive infomercial content of the infomercial unit comprises the steps of:

deriving the U3I associated from the at least one infomercial unit thus received;

determining the plurality of unique or friendly URLs embedded with the infomercial unit;

decoding a corresponding redirect URL mapped with the plurality of determined unique or friendly URLs; and downloading the interactive infomercial content from the single redirect URL.

4. The method as claimed in claim 1, further comprising:

updating a user repository, coupled with the IIS, with the connect back response message thus generated; and generating reports based on the connect back responses from users.

5. The method as claimed in claim 4, wherein the generated reports comprises one or more reports indicating a plurality of response scores associated with the connect back responses to the downloaded interactive infomercial content based on geographical location of the user, network (IP) address of the user devices, connect back response time, and predetermined transmit modes.

6. The method as claimed in claim 1, wherein the interactive animation content comprises one or more animation sections that are downloaded and played in a series manner.

7. The method as claimed in claim 1, wherein the at least one interactive infomercial content is downloaded and played on a pre-defined user interface on a mobile viewing device of a user, wherein the pre-defined user interface comprises a plurality of user defined connect back buttons that are placed at one or more user-defined locations on the pre-defined user interface.

8. An interactive infomercial system (IIS) system for enabling interactive infomercials, comprising: a processor; one or more mobile viewing device associated with user, coupled with the processor; and a memory communicatively coupled to the processor, wherein the memory stores processor-executable instructions, which, on execution, cause the processor to: receive data associated with user of viewing one or more interactive infomercial content on the one or more mobile viewing device associated with a user; select at least one interactive infomercial content corresponding to the received user data; generate at least one infomercial unit comprising the at least one interactive infomercial content, a unique infomercial identification information (U3I) associated with the selected interactive infomercial content, a predetermined transmit mode for transmitting the interactive infomercial content and a plurality of connect back response modes for responding to the interactive infomercial content, wherein the interactive infomercial content includes at least an interactive animation content, wherein the U3I comprises at least one or more of unique Uniform Resource Locator (URL) and friendly URL associated with the interactive infomercial content, wherein the unique URL is a randomly generated alphanumeric characters of predetermined size and the friendly URL is a personalized alphanumeric characters of predetermined size associated with the interactive infomercial content source and the user data; and transmit the at least one infomercial unit in the predetermined transmit mode to the mobile viewing device of the user; wherein the processor is configured to determine the U3I by one or more steps of: generating a plurality of unique or friendly URLs associated with the interactive infomercial content; generating a redirect URL associated with the interactive infomercial content; mapping the plurality of unique or friendly URLs to the redirect URL; and embedding the plurality of unique or friendly URLs in the at least one infomercial unit.

9. The system as claimed in claim 8, further comprising a user repository coupled with the processor and configured to store connect back response messages generated in response to connect back response by the user.

10. The system as claimed in claim 8, wherein the processor is configured to perform one or more steps of:

downloading and rendering the at least one interactive infomercial content of the infomercial unit along with user data in the one or more mobile viewing device of the user, wherein the user data comprises user profile information and user transaction data;

receiving, from the mobile viewing device, user selection of at least one connect back response mode in response to the rendered interactive infomercial content;

generating a connect back response message comprising the transmit mode, the connect back response mode selected by the user, the U3I associated with the interactive infomercial content and the user inputs related to the infomercial content; and storing the connect back response message in the IIS.

11. The system as claimed in claim 10, wherein the processor is configured to enable downloading of the at least one interactive infomercial content of the infomercial unit by performing the steps of:

deriving the U3I associated from the at least one infomercial unit thus received;

determining the plurality of unique or friendly URLs embedded with the infomercial unit;

decoding a corresponding redirect URL mapped with the plurality of determined unique or friendly URLs; and downloading the interactive infomercial content from the single redirect URL.

12. The system as claimed in claim 8, wherein the processor is further configured to generate reports based on the connect back responses from users, wherein the generated reports comprises one or more reports indicating a plurality of response scores associated with the connect back responses to the downloaded interactive infomercial content based on geographical location of the user, network (IP) address of the user devices, connect back response time, and predetermined transmit modes.

13. The system as claimed in claim 8, wherein the at least one interactive infomercial content is downloaded and played on a pre-defined user interface on a mobile viewing device of the user, wherein the pre-defined user interface comprises a plurality of user defined connect back buttons that are placed at one or more user-defined locations on the pre-defined user interface.

14. A non-transitory computer readable medium including instructions stored thereon that when processed by at least one processor cause a test automation system to perform acts of: receiving, by an interactive infomercial system (IIS), data associated with user of viewing one or more interactive infomercial content on a mobile viewing device associated with a user; selecting at least one interactive infomercial content corresponding to the received user data; generating at least one infomercial unit comprising the at least one interactive infomercial content, a unique infomercial identification information (U3I) associated with the selected interactive infomercial content, a predetermined transmit mode for transmitting the interactive infomercial content and a plurality of connect back response modes for responding to the interactive infomercial content, wherein the interactive infomercial content includes at least an interactive animation content, wherein the U3I comprises at least one or more of unique Uniform Resource Locator (URL) and friendly URL associated with the interactive infomercial content, wherein the unique URL is a randomly generated alphanumeric characters of predetermined size and the friendly URL is a personalized alphanumeric characters of predetermined size associated with the interactive infomercial content source and the user data; and transmitting the at least one infomercial unit in the predetermined transmit mode to the mobile viewing device of the user; wherein the instructions stored thereon causes the at least one processor to determine the U3I by one or more steps of: generating a plurality of unique or friendly URLs associated with the interactive infomercial content; generating a redirect URL associated with the interactive infomercial content; mapping the plurality of unique or friendly URLs to the redirect URL; and embedding the plurality of unique or friendly URLs in the at least one infomercial unit.

15. The medium as claimed in claim 14, wherein the instructions stored thereon further causes the at least one processor to perform acts of:

downloading and rendering the at least one interactive infomercial content of the infomercial unit along with user data in the one or more mobile viewing device of the user, wherein the user data comprises user profile information and user transaction data;

receiving, from the mobile viewing device, user selection of at least one connect back response mode in response to the rendered interactive infomercial content;

generating a connect back response message comprising the transmit mode, the connect back response mode selected by the user, the U3I associated with the interactive infomercial content and the user inputs related to the infomercial content; and storing the connect back response message in the ITS.

16. The medium as claimed in claim 15, wherein the instructions stored thereon causes the at least one processor to perform the step of downloading the at least one interactive infomercial content of the infomercial unit by the steps of:

deriving the U3I associated from the at least one infomercial unit thus received;

determining the plurality of unique or friendly URLs embedded with the infomercial unit;

decoding a corresponding redirect URL mapped with the plurality of determined unique or friendly URLs; and downloading the interactive infomercial content from the single redirect URL.

17. The medium as claimed in claim 14, wherein the instructions stored thereon further causes the at least one processor to perform the acts of:

updating a user repository, coupled with the IIS, with the connect back response message thus generated; and generating reports based on the connect back responses from users, wherein the generated reports comprises one or more reports indicating a plurality of response scores associated with the connect back responses to the downloaded interactive infomercial content based on geographical location of the user, network (IP) address of the user devices, connect back response time, and predetermined transmit modes.

18. The medium as claimed in claim 14, wherein the interactive animation content comprises one or more animation sections that are downloaded and played in a series manner; further wherein the at least one interactive infomercial content is downloaded and played on a pre-defined user interface on a mobile viewing device of a user, wherein the pre-defined user interface comprises a plurality of user defined connect back buttons that are placed at one or more user-defined locations on the pre-defined user interface.

* * * * *